United States Patent [19]
Williams et al.

[11] Patent Number: 5,995,849
[45] Date of Patent: Nov. 30, 1999

[54] DIRECT WIRELESS COMMUNICATION SYSTEM AND METHOD OF OPERATION

[75] Inventors: Bill G. Williams, Waco; Jerry W. Petermann, Pflugerville, both of Tex.

[73] Assignee: Direct Wireless Communication Corp., Waco, Tex.

[21] Appl. No.: 08/979,676

[22] Filed: Nov. 26, 1997

[51] Int. Cl.$^6$ ............................. H04Q 7/24; H04Q 7/26
[52] U.S. Cl. ..................... 455/555; 455/554; 455/560
[58] Field of Search ................................. 455/555, 560, 455/75, 554

[56] References Cited

U.S. PATENT DOCUMENTS

| | | | |
|---|---|---|---|
| 3,065,421 | 11/1962 | Hart | 325/55 |
| 3,105,118 | 9/1963 | Berglund | 179/41 |
| 3,426,279 | 2/1969 | Berman | 325/21 |
| 3,626,112 | 12/1971 | Henquet | 179/41 |
| 3,898,390 | 8/1975 | Wells et al. | 179/41 |
| 4,066,964 | 1/1978 | Costanza et al. | 325/55 |
| 4,069,454 | 1/1978 | Winkelmann | 325/25 |
| 4,127,744 | 11/1978 | Yoshikawa et al. | 179/2 EB |
| 4,166,927 | 9/1979 | Hamsoki | 179/2 EB |
| 4,320,523 | 3/1982 | Horikawa et al. | 375/103 |
| 4,400,585 | 8/1983 | Kaman et al. | 179/2 EB |
| 4,423,413 | 12/1983 | da Silva | 340/825.03 |
| 4,534,061 | 8/1985 | Ulug | 455/17 |
| 4,597,104 | 6/1986 | Ohki et al. | 455/32 |
| 4,622,681 | 11/1986 | Snell et al. | 375/48 |
| 4,630,257 | 12/1986 | White | 370/29 |
| 4,646,358 | 2/1987 | Shanley | 455/35 |
| 4,675,863 | 6/1987 | Paneth et al. | 370/50 |
| 4,716,407 | 12/1987 | Borras et al. | 340/825.04 |
| 4,747,101 | 5/1988 | Akaiwa et al. | 370/95 |
| 4,817,089 | 3/1989 | Paneth et al. | 370/95 |
| 4,894,856 | 1/1990 | Nakanishi et al. | 379/61 |

(List continued on next page.)

FOREIGN PATENT DOCUMENTS

WO 94/05101  3/1994  WIPO.

OTHER PUBLICATIONS

K. Kinoshita et al., "A Digital Mobile Telephone System Using TD–FDMA Scheme," *Denshi Tsushin Gakkai Ronbun Shi*, v. J64–B, No. 9, pp. 1016–1023 (1981).

K. Kinoshita et al., "Digital Mobile Radio Telephone System Using TD/FDMA Scheme," *IEEE* (International Conference on Communications—Jun. 14–18, 1981), pp. 23.4.1–23.4.5.

Henry and Glance, "A New Approach to High–Capacity Digital Mobile Radio," *The Bell System Technical Journal*, 60(8):1891–1904 (1981).

*Primary Examiner*—Dwayne D. Bost
*Assistant Examiner*—Alan Gantt
*Attorney, Agent, or Firm*—Taylor Russell & Russell, P.C.

[57] ABSTRACT

A digital direct wireless communication system that permits direct, point-to-point communication (voice or data) between transceivers without the infrastructure associated with traditional cellular systems. The transceivers may communicate with a Public Switched Telephone Network (PSTN), with a plurality of fixed base units, a plurality of mobile units and possibly, a plurality of repeaters. The mobile units are operable to communicate point-to-point with other mobile units or other fixed base units. Similarly, the fixed base units are operable to communicate point-to-point with other fixed base units or other mobile units. The system repeaters, if present, are dispersed throughout the communication coverage area for receiving and re-transmitting radio signals from the mobile and fixed base units, if necessary. The mobile and fixed base units may also communicate with remote telephone users through the PSTN. In this mode, a mobile user may contact a remotely located telephone (outside the system) by dialing the number for the remote telephone. The mobile unit will establish communication with a fixed base unit associated with the mobile unit. The fixed base unit detects that the call from the mobile is intended for a telephone located outside the point-to-point communication system; i.e. outside the system. Upon detecting this condition, the fixed base unit provides the switching capabilities to connect the mobile unit to the remote telephone.

11 Claims, 9 Drawing Sheets

U.S. PATENT DOCUMENTS

| | | | |
|---|---|---|---|
| 4,921,464 | 5/1990 | Ito et al. | 455/34 |
| 4,921,705 | 5/1990 | Arai et al. | 424/450 |
| 4,977,608 | 12/1990 | Hashimoto et al. | 425/62 |
| 5,008,900 | 4/1991 | Critchlow et al. | 375/8 |
| 5,020,094 | 5/1991 | Rash et al. | 379/62 |
| 5,022,024 | 6/1991 | Paneth et al. | 370/50 |
| 5,027,431 | 6/1991 | Tanaka et al. | 455/214 |
| 5,031,098 | 7/1991 | Miller et al. | 364/405 |
| 5,058,205 | 10/1991 | Roehrs et al. | 455/35 |
| 5,119,375 | 6/1992 | Paneth et al. | 370/95.1 |
| 5,121,391 | 6/1992 | Paneth et al. | 370/95.1 |
| 5,127,042 | 6/1992 | Gillig et al. | 379/59 |
| 5,148,548 | 9/1992 | Meche et al. | 455/34 |
| 5,163,158 | 11/1992 | Tendler et al. | 455/11.1 |
| 5,164,985 | 11/1992 | Nysen et al. | 380/9 |
| 5,202,825 | 4/1993 | Miller et al. | 364/405 |
| 5,212,805 | 5/1993 | Comroe et al. | 455/33.1 |
| 5,229,995 | 7/1993 | Strawczynski et al. | 370/280 |
| 5,265,150 | 11/1993 | Helmkamp et al. | 455/555 |
| 5,276,703 | 1/1994 | Budin et al. | 375/1 |
| 5,287,549 | 2/1994 | Roehrs et al. | 455/35.1 |
| 5,305,215 | 4/1994 | Brekkestran et al. | 364/424.1 |
| 5,325,396 | 6/1994 | Critchlow et al. | 375/8 |
| 5,327,580 | 7/1994 | Vignali et al. | 455/35.1 |
| 5,341,130 | 8/1994 | Yardley et al. | 340/825.06 |
| 5,365,573 | 11/1994 | Sakamoto et al. | 379/61 |
| 5,396,651 | 3/1995 | Nitardy | 455/54.2 |
| 5,410,732 | 4/1995 | Ames et al. | 455/33.1 |
| 5,410,737 | 4/1995 | Jones | 455/56.1 |
| 5,442,680 | 8/1995 | Schellinger et al. | 379/58 |
| 5,469,496 | 11/1995 | Emery et al. | 379/58 |
| 5,471,645 | 11/1995 | Felix | 455/34.2 |
| 5,590,399 | 12/1996 | Tadashi et al. | 455/33.3 |
| 5,670,950 | 9/1997 | Otsuka | 340/825.33 |
| 5,768,308 | 6/1998 | Pon et al. | 375/219 |
| 5,799,250 | 8/1998 | Veloso et al. | 455/422 |

| 151 | 152 | 153 | 153 | 153 | 153 | 154 | 156 | 156 | 156 | 157 | 157 | 157 | 157 | 158 |

FIG-6A

| 161 | 162 | 163 | 163 | 163 | 163 | 164 | 165 | 165 | 165 | 166 | 166 | 166 | 166 | 167 | 167 | 168 |

FIG-6B

| 169 | 170 | 171 | 171 | 171 | 171 | 172 | 173 | 173 | 173 | 174 | 174 | 174 | 174 | 175 |

FIG-6C

DIRECT WIRELESS COMMUNICATION SYSTEM AND METHOD OF OPERATION

This invention relates to an improved wireless communication system and, in particular, to an improved multichannel, two-way radio, point-to-point communications system that eliminates the need for expensive infrastructure equipment.

BACKGROUND OF THE INVENTION

In recent years, wireless communication systems have emerged as an important alternative to wireline communications in the United States. These systems offer users the convenience of mobility and personal services, as well as significant cost savings over traditional wireline systems in the installation and relocation of telecommunications equipment. The use of wireless systems is also proliferating in remote areas of the world due to the ease of installation of such systems as compared to wired communications.

One type of wireless communications system, cellular telephone systems, uses radio communications between a plurality of subscriber units with in the wireless system and between subscriber units and the Public Switched Telephone Network ("PSTN") for calls to or from outside the wireless system.

Figure 1:
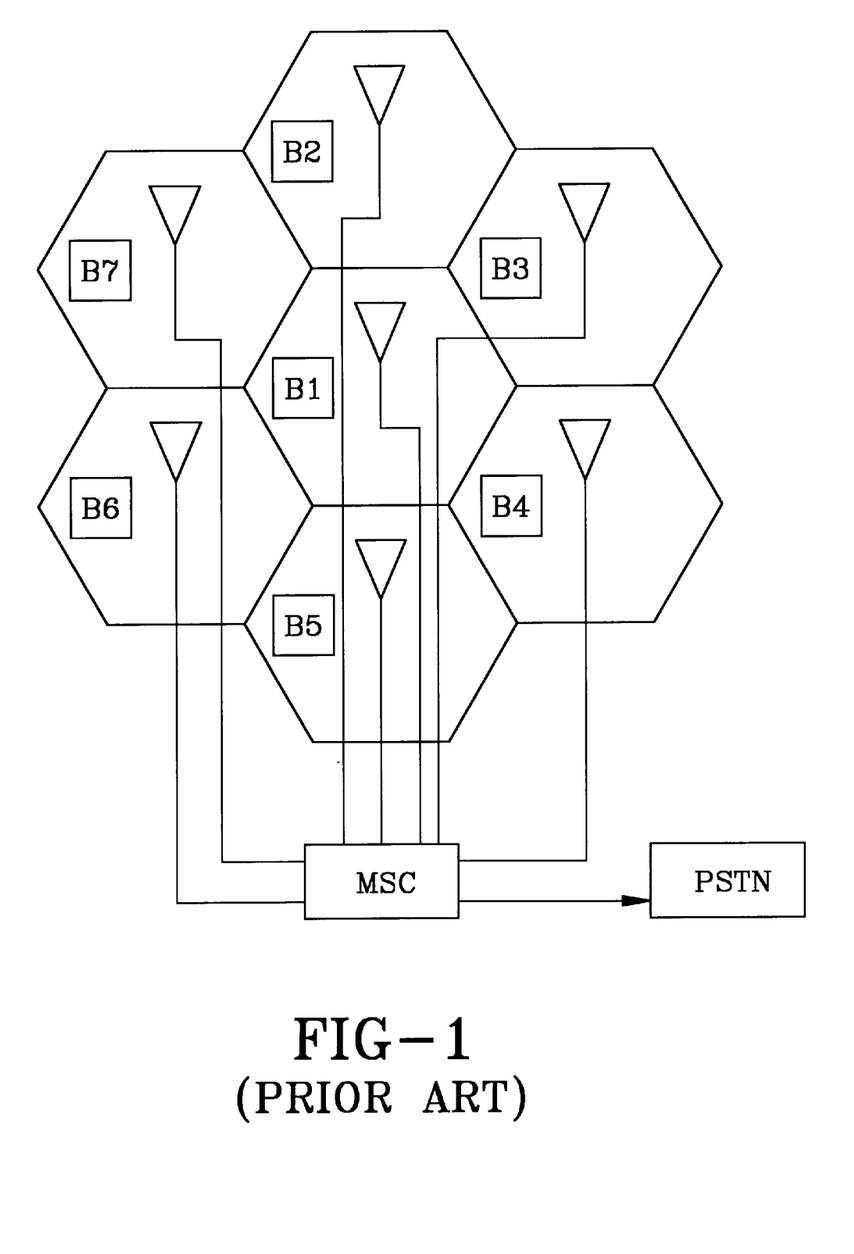
FIG. 1 is a prior art cellular telephone system.

In cellular systems, as illustrated in FIG. 1, a geographical area is divided into cells covered by the radio system at the base station. The cells are connected via a respective base station (B1–B7) to a Mobile Services Switching Center ("MSC"). The MSC, in turn, is connected to the PSTN. The telephone users (mobile units) communicate with the MSC through the base stations. The MSC switches calls between wireline and mobile subscribers, controls signaling to the mobile stations, compiles billing statistics, and controls the overall operation of the system.

Cellular systems overcome many of the problems associated with traditional wireline communications. These systems, however, still require the installation of expensive infrastructure equipment (i.e., base stations B1–B7, and MSC's) to provide system functionality and the necessary switching capabilities.

Other wireless communications systems overcome the need for expensive infrastructure equipment by using point-to-point radio communications. However, these systems do not provide the extensive switching capabilities provided in cellular and PCS systems. For example, multiple-user radio transceiver communication systems exist in which squelching circuits are used to limit communications between selected radio transceivers within a group of transceivers. In one such system described in U.S. Pat. No. 4,646,358, a first transceiver sends an origination address and a destination address. The transceivers within the broadcast area receive these addresses. When the received destination address corresponds to the address of the second transceiver, the second transceiver turns off its squelch circuit in order to receive the communications from the first transceiver. Any transceiver that receives the radio broadcast and does not have a corresponding destination address leaves its squelch circuit on so that the received signal cannot be heard by the user.

The second transceiver then communicates with the first transceiver by sending its address and the origination address of the first transceiver with a broadcast communication. When the first transceiver receives the broadcast communication with its address, the first transceiver turns off its squelching circuit in order to receive the communications. Thus, two transceivers may establish communications in a broadcast radio communications system. In operation, the system requires that all signaling between transceivers include both the address code of the originating station and the address code of the destination station. However, this system suffers from several disadvantages. For example, because origination and destination addresses must be sent with all communications, the likelihood of coding and transmission errors increases. Therefore, if an origination address is incorrectly received, stored, or retransmitted, the intended transceiver may not receive the communication.

In another system using squelching circuits, as described in U.S. Pat. No. 5,058,205, the origination transceiver only transmits the address with the initial message transmission. Once communication is established between two transceivers, a responding transceiver does not send its own address nor does the originating transceiver send its own address again during two-way communications between the two transceivers. Instead, the only address information required to be sent between the transceivers is the destination address of the communications.

These point-to-point radio communication systems, however, do not provide the capabilities associated with traditional wireless systems. In particular, these systems do not permit these transceivers to send and receive calls via the PSTN, maintain billing information, or provide switching capabilities associated with cellular telephone systems.

Thus, a need has arisen for an improved wireless communication system that eliminates the problems of existing systems, while maintaining the convenience of mobility and personal services provided by traditional wireless systems.

SUMMARY OF THE INVENTION

The present invention comprises a FM digital direct wireless communication system with a plurality of fixed base units, a plurality of mobile units and possibly, a plurality of repeaters. The mobile units are operable to communicate point-to-point with other mobile units or other fixed base units. Similarly, the fixed base units are operable to communicate point-to-point with other fixed base units or other mobile units. The system repeaters, if present, are dispersed throughout the communication coverage area for receiving and re-transmitting radio signals from the mobile and fixed base units, if necessary.

The mobile and fixed base units may also communicate with remote telephone users through the Public Switched Telephone Network (PSTN). For example, a mobile user may contact a remotely located telephone (outside the system) by simply dialing the number for the remote telephone. The mobile will establish communication with a fixed base unit associated with the mobile unit. The fixed base unit detects that the call from the mobile is intended for a telephone located outside the point-to-point communication system; i.e. outside the system. Upon detecting this condition, the fixed base unit provides the switching capabilities to connect the mobile unit to the remote telephone.

System users may elect to operate fixed base units without PSTN interface connections or choose the convenience of mobile units which may operate independently of any fixed base units.

Specifically, the present invention contemplates a method of operating a wireless communication system, the system including a plurality of mobile transceivers and at least one stationary transceiver connected to a public switched telephone network, the method comprising, in a first mode of operation, establishing intra-system duplex communication between one of the plurality of transceivers and another one of the plurality of transceivers, without the use of the public switched telephone network; and in a second mode of operation, establishing inter-system duplex communication between one of the plurality of transceivers and a communication device outside of the system, using the public switched telephone network and the at least one stationary transceiver.

The step of establishing duplex communication between one of the plurality of mobile transceivers and another one of the plurality of mobile transceivers, may include, performing a call initiating procedure, including, transmitting from an originating mobile transceiver, a call initiation sequence, including an address of the originating mobile transceiver and an address of a destination mobile transceiver; transmitting from the destination mobile transceiver, a return sequence, in response to the call initiation sequence; and transmitting from the originating mobile transceiver, a call lock sequence, in response to the call return sequence. Upon successful completion of the call initiating procedure, voice or data communication is established between the originating mobile transceiver and the destination mobile transceiver.

The transmitting of the call initiation and call lock sequence from the originating mobile transceiver to the destination mobile transceiver may be on a single call set-up frequency, and the transmitting of the call return sequence from the destination mobile transceiver to the originating mobile transceiver may be on a single call return set-up frequency. This single call set-up frequency and single call return frequency may be used system wide.

The system may also include at least one repeater, in which case the method may further comprise, including a boost code in the call initiation sequence; and activating the at least one repeater in response to receipt of a call initiation sequence including a boost code, causing the repeater to receive, amplify and re-transmit communications from the originating mobile transceiver and the destination mobile transceiver. The boost code may be included in response to a request by a user of the originating mobile transceiver, or it may be included automatically. For example, if no call return sequence is returned within the predetermined time period during which the call initiation sequence without a boost flag is transmitted, a boost code is automatically added to the call initiation sequence, and the call initiation sequence is re-transmitting the for a second predetermined time.

The call lock sequence may include data indicative of a broadcast frequency pair, the method may then further comprise, transmitting voice or data communication from the originating mobile transceiver to the destination mobile transceiver using one of the broadcast frequency pair, and transmitting voice or data communication from the destination mobile transceiver to the originating mobile transceiver using the other one of the broadcast frequency pair. The call lock sequence may also include a frequency skip code, in which case the broadcast frequency pair is periodically changed the as a function of the frequency skip code.

The invention also contemplates a wireless communication system, comprising: a plurality of mobile transceivers, at least one stationary transceiver, with at least one of the at least one stationary transceiver being connecting to a public switched telephone network. Each of the plurality of mobile transceivers and each of the at least one stationary transceiver includes a data processor programmed to operate the transceiver in a stand-by mode, in a call receive mode, or in a call transmit mode, and to conduct both intra-system communication without use of the public switched telephone network, and inter-system communication using the public switched telephone network Accordingly, it is an advantage of the present invention to provide direct, point-to-point communication (voice or data) between transceivers without the infrastructure associated with traditional cellular systems. Another advantage of the present invention is to allow the use of these transceivers to communicate with the PSTN.

Another advantage of the present invention is to provide a communication system that may be inexpensively installed and operated. For example, a communication system that may be used in remote areas of the United States, third world countries, or in small municipalities.

Yet another advantage of the invention is to provide a reliable, low-cost, low maintenance, easy to use communication system.

BRIEF DESCRIPTION OF THE DRAWINGS

For a more complete understanding of the present invention and the advantages thereof, reference is now made to the following description taken in conjunction with the accompanying drawings in which.

DESCRIPTION OF ILLUSTRATIVE EMBODIMENTS

Figure 2:
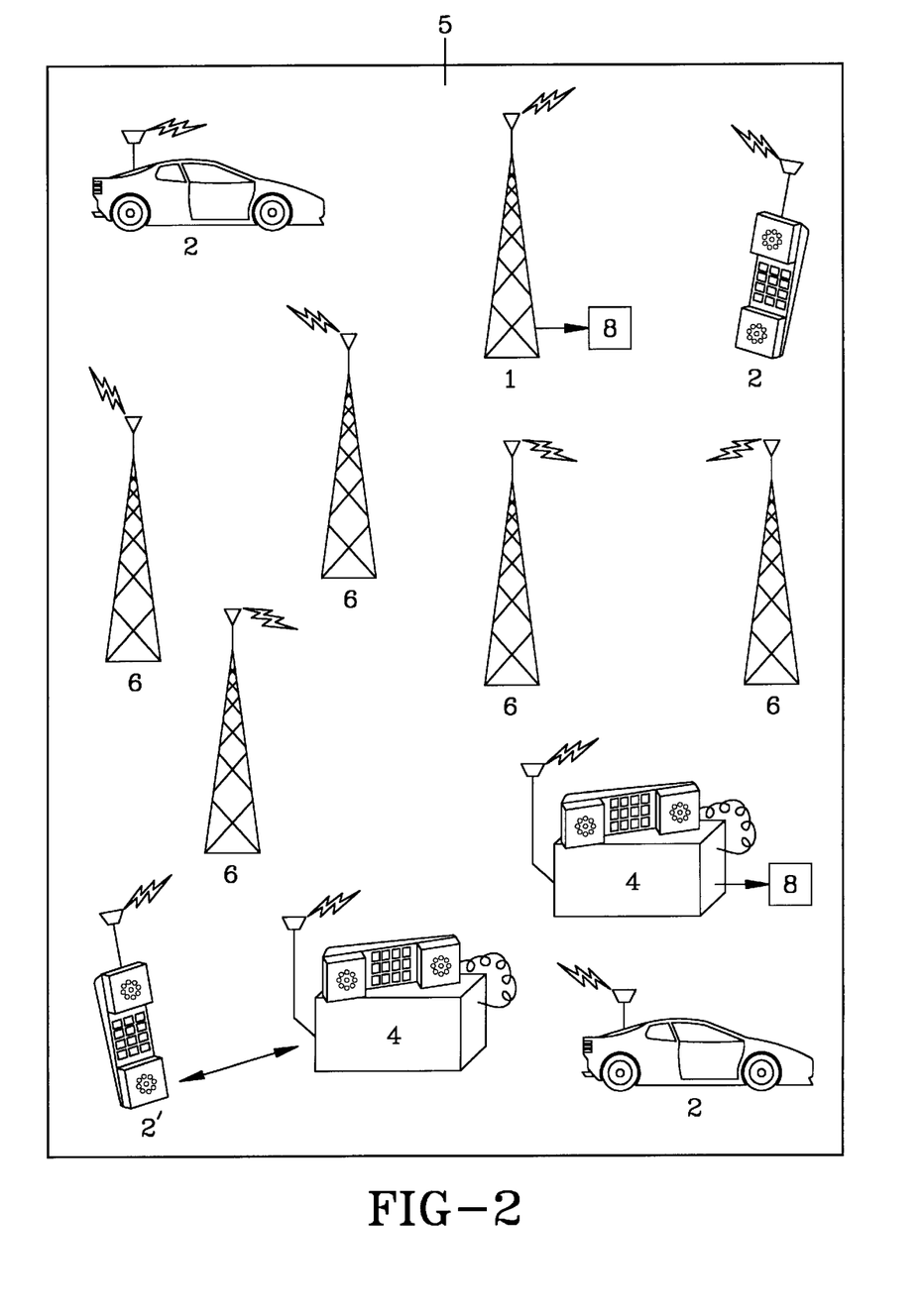
FIG. 2 is an embodiment of the wireless communication system of the present invention.

The present system provides the convenience of mobility and the personal services of traditional wireless systems without the associated and centralized switching and routing infrastructure. FIG. 2 illustrates an embodiment of the present invention. The system 5 comprises a plurality of mobile units 2, a plurality of fixed base units 4, PSTN interface links 8 and repeaters 1, 6.

The following are the several methods of transceiver communications possible with the system 5. Mobile units 2 may communicate directly with other mobile units 2 (intra-mobile communications). Mobile units 2 may also communicate directly with the fixed base units 4 (mobile-fixed base communications). Mobile units 2 also communicate with other mobile units 2 through repeaters 6 (inter-mobile communication).

Mobile units 2 may also communicate with the fixed base units 4 through repeaters 6 (mobile-fixed base communications). In addition, mobile units 2 may communicate with wireline telephones 8 via an associated fixed base unit 4, which has its own PSTN interface connection (mobile-fixed base-PSTN communications).

Mobile units 2 without PSTN 8 interface connections may communicate with wireline telephones 8 via repeater 1, which provides a link or interface to the PSTN (mobile-special services-PSTN link communications).

Associated mobile unit 2' is a mobile unit operated as a mobile extension for a fixed base unit 4. When a fixed base unit 4 owner uses this associated mobile unit 2' to place a call to a non-system, outside PSTN 8 phone number, the associated mobile unit 2' automatically selects its fixed base unit 4 with the PSTN 8 interface (associated mobile-fixed base-PSTN link). Call placement is transparent and seamless.

Fixed base units 4 may communicate with other fixed base units 4, directly (intra-fixed base communications).

Fixed base units 4 without PSTN interface connections may also communicate with wireline telephones 8 (and receive outside PSTN calls) via repeater 1, which provides a link or interface to the PSTN 8 (fixed base-special services-PSTN link communications).

Calls placed to outside PSTN 8 phone numbers through the repeater 1 are logged and billed to the appropriate mobile unit 2 or fixed base unit 4 user making the call (repeater 1-PSTN interface billing). This is accomplished through the reading of the Call Initiation Sequence by repeater 1 (described below in more detail with reference to FIG. 5B). All phones within system 5 are programmed to call repeater 1 if a number of a predetermined number of digits (for example, seven digits or more) is entered (unless the unit making the call is an associated mobile unit 2, paired with a fixed base unit 4 that has PSTN 8 interface connections). The activation code which makes this possible is simply a repeater 1 address entry in the Call Initiation Sequence Code (FIG. 6A). Repeater 1 is the only repeater with a distinct address. It functions as a common system repeater unless so addressed. Internally, repeater 1 has a computer that logs these calls by reading the origination address in the Call Initiation Sequence Code of the transceiver. A time code stamp is recorded as each outgoing call (to the PSTN 8) is made. At the end of the month, repeater 1's PSTN-number (Public Phone Company) bill for long distance charges is received. A clerk reviews this bill, matching the times and charges to the owners of the origination address codes who called from within the system 5 to the PSTN 8 link. Bills are sent. If funds are not received in a timely fashion, the clerk may activate a computer-controlled call block for offending origination address numbers, eliminating further access by these customers to the PSTN 8 through repeater 1.

The repeaters 1 and 6 allow the coverage area of the system to be extended as explained in more detail below.

When a person outside the system 5 chooses to call someone inside the system 5 who is not directly interfaced to the PSTN 8, the caller simply dials the main PSTN phone number for the system 5 (automatically answered by repeater 1 which is interfaced to the PSTN 8). The system repeater 1 computer will then ask the calling PSTN 8 party to enter the five-digit transceiver Phone Number. The computer converts this five digit number into a Call Initiation Sequence Code and broadcasts the Call Initiation. When the phone answers with the system 5 (a mobile unit 2 or a fixed base unit 4), the call continues to its destination in a transparent and seamless manner.

These, and other types of communications within and outside of system 5 are discussed below in more detail with reference to the flowcharts of FIG. 5 and the code strings of FIG. 6.

Figure 3:
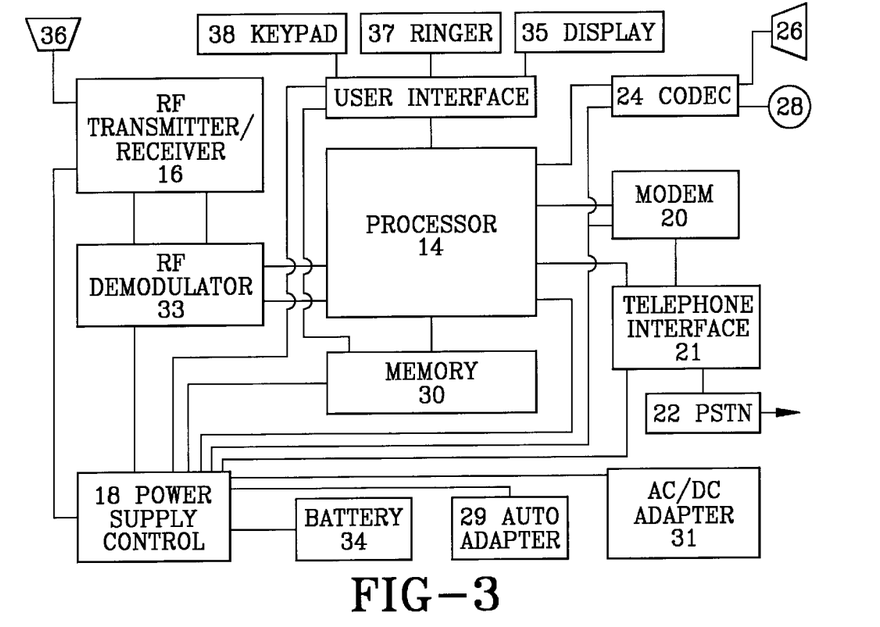
FIG. 3 is a system block diagram of a base unit of the present invention.

FIG. 3 is a system block diagram of an embodiment of a fixed base unit 4 of the present invention. The fixed base unit 4 includes, a user interface 12, a processor 14, an RF Transmission/Receiving unit 16, the RF Modulator 33, a power supply control 18, a modem 20, memory 30, speaker 26, a microphone 28, battery 34, vehicle power adapter 29, AC/DC power converter adapter 31 and an optional telephone (PSTN) interface 22.

The user interface 12 allows the user to interact with the fixed base unit 10. The user interface 12 includes a display 35, a keypad 38, and a ringer 37. Voice signals are sent and received via codec 24 through speaker 26 and microphone 28.

User generated data, status and prompting information generated by the fixed base unit 4 is presented to the user via a display 35. The display 35 may also provide dedicated indicators to show status information, including low battery, incoming call, and signal strength.

The fixed base unit 4 also includes a keypad 38, providing the user an interface for selecting and initiating unit-to-unit communication, selecting user functions and features, and initiating user programmable features. The keypad 38 may include a set of standard buttons that are required to dial a telephone number and a set of dedicated buttons for special functions.

Data entered at the keypad 38 is provided to the processor 14, where the data is processed. External memory 30 may be connected to the processor 14 for storing program code in ROM or data in RAM. Alternatively, the processor 14 may include its own RAM or ROM. The processor 14 performs all the switching capabilities to determine whether a call should be sent via RF communications or via the PSTN connection. If the call is to be sent via RF communications, the processor 14 formats the data and instructs the data to be transmitted through the RF Transmission/Receiving unit 16.

Voice communications performed via the wireless system require processing of I/O or Input/Output analog signals since the microphone 28 and the speaker 26 are analog devices. The voice signals produced by the microphone 28 are converted to digital representations by codec 24. After conversion, the digital signal may be encoded or encrypted prior to RF transmission to provide security of the communications or to minimize (or compress) the amount of digital information prior to RF transmission. For example, the voice data may be encoded using any known available algorithm for coding voice data including, for example, Code-Excited Linear Predictive Coding (CELP).

The RF Transmission/Receiving unit 16 transmits a radio frequency signal representing the data to be transmitted. The codec 24 provides the processor 14 with digitized voice data, which is then presented to the RF Modulator 33 for digitally modulating the RF carrier for broadcast through the RF Transmission/Receiving unit 16 and the antenna 36. Received-call voice data, received over the antenna 36 and by the RF Transmission/Receiving unit 16, is de-modulated from the RF carrier within the RF Modulator 33 and presented to the processor 14 in digital form for routing to the codec 24. The codec 24 converts the digital voice data into analog signals for the speaker 26 transducers to convert to sound waves enabling the user to hear the transmitted voice through the speaker 26. The processor 14 encrypts or compresses any digital signals being transmitted prior to these signals being presented to the RF Modulator 33. Upon receiving call data, the processor 14 decrypts or decompresses any digital signals received from the RF Modulator 33 prior to presentation to the codec 24.

Digital data from a facsimile or computer modem source which has been transmitted to a fixed base unit 4 is recognized by the transmission of digital data signal protocols sent at the beginning of any facsimile or computer modem transmission. The processor 14 reads these coded instructions and routs the digital data to the modem 20 for output to an attached facsimile or computer. This routing avoids converting these digital signals to analog by the codec 24.

In operation, the RF Transmission/Receiving unit 16 may be capable of transmitting and receiving data at a variety of frequencies through antenna 36. For example, the RF Transmission/Receiver unit 16 may be configured to operate in the traditional cellular frequency of 800 MHz. In another embodiment of the invention, the RF Transmission/Receiver unit 16 permits the fixed base unit 4 to operate in the PCS frequency of 1.9 GHz. Other frequencies are also acceptable. It is presently contemplated that frequencies within the range of 50 MHz to 5 GHz may be used, and preferably 400–450 MHz.

Further, the processor 14 may also configure the voice data or facsimile/computer digital data for communication over the PSTN 8. Therefore, the processor 14 must be capable of providing the switching capabilities traditionally found in base station equipment in cellular telephone systems. In operation, if the call at the fixed base unit 4 is to be sent via the PSTN 8, the telephone interface 21 provides the interface to the PSTN 8. The telephone interface 21 allows the user to initiate, establish, and terminate outgoing calls as well as receive, respond to, and terminate incoming calls from the PSTN 8. In one exemplary embodiment, the telephone interface 21 includes a receptacle type connector that allows connection to the PSTN 8 by using a cable assembly (PSTN Cable Assembly) terminated at the end with, for example, an RJ-11, six position plug type telephone connector. It should be understood, however, that the present invention may interface to other systems in foreign countries via any standard telephone adapter.

In a configuration where the fixed base unit 4 is not connected to a PSTN 8 interface, outgoing PSTN 8 calls may be automatically placed by accessing the repeater network shown in FIG. 2 where repeater 1 is linked to the PSTN 8. These calls are logged and billed to the appropriate fixed base unit 4 user making the call. This process is known as Repeater 1-PSTN Interface Billing. It is accomplished through the reading of the Call Initiation Sequence by repeater 1. All system phones are programmed to call repeater 1 if a number of seven digits or more is entered (unless the unit making the call is an associated mobile unit 2, paired with a fixed base unit 4 that has PSTN 8 interface connections). The activation code which makes this possible is simply a repeater 1 address entered in the Call Initiation Sequence Code. Repeater 1 is the only repeater with a distinct address. It functions as a common repeater unless so addressed. Internally, repeater 1 has a computer that logs these calls by reading the origination address in the Call Initiation Sequence Code of the transceiver. A time code stamp is recorded by the repeater 1 computer as each outgoing call (to the PSTN 8) is made. At the end of the month, repeater 1's PSTN-number (Public Phone Company) bill for long distance charges is received. A clerk reviews this bill, matching the times and charges to the owners of the origination address codes who called from within the system 5 to the PSTN 8 link. Bills are sent. If funds are not received in a timely fashion, the clerk may activate a computer-controlled call block for offending origination address numbers, eliminating further access by these customers to the PSTN 8 through repeater 1.

It must be understood that a fixed base unit 4 does not require an associated mobile unit 2 for operability; nor does a mobile unit 2 require an associated fixed base unit 4 for independent operability. Such association is merely a convenience and should be viewed as operating much as an extension telephone would perform in a wireline system; with the unique ability for independent mobile unit 2 operation, if desired.

A modem 20 also provides a data communications link to the PSTN. The modem 20 may communicate via the PSTN using any readily available and accepted modulation technique such as, for example, Frequency Shift Keying (FSK). It should be understood, however, that other modulation techniques may be used without departing from the spirit and scope of the present invention. For example, the modem 20 may use Frequency Modulation (FM), Phase Shift Keying (FSK), Quadrature Amplitude Modulation (QAM), or other modulation techniques known to the art.

The fixed base unit 4 includes a power supply control 18. Power is supplied to the components by one of the following; an internal battery 34, an automotive cigarette lighter plug adapter 29 or an external AC electrical outlet via an AC/DC transformer converter 31. A fixed base unit 4 may be mounted in a motor home and be powered by a car battery.

Figure 4:
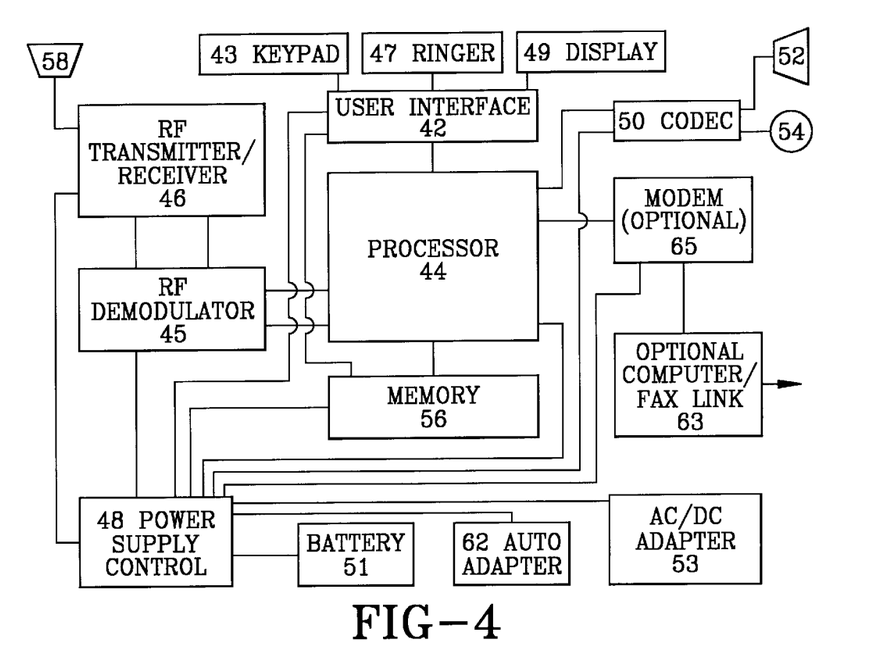
FIG. 4 is a system block diagram of a mobile unit of the present invention.

FIG. 4 is a system block diagram of an embodiment of a mobile unit 22 of the present invention. The mobile unit 2 includes: a user interface 42, a processor 44, an RF Transmission/Receiving unit 46, an RF Modulator 45, an antenna 58, a power supply control 48, a codec 50, a memory 56, a battery 51, a vehicle power adapter 62, an AC/DC transformer converter 53, a speaker 52, and a microphone 54.

The user interface 42 allows the user to interact with the mobile unit 2. The user interface 42 includes a display 49, a keypad 43, and a ringer 47. Voice signals are sent and received via codec 50 through speaker 52 and microphone 54.

User generated data, status and prompting information generated by the mobile unit 2 is presented to the user via a display 49. The display 49 may also provide dedicated indicators to show status information, including low battery, incoming call, and signal strength.

The mobile unit 2 also includes a keypad 43. The keypad 43 provides the user interface for selecting and initiating unit-to-unit communication, selecting user functions and features, and initiating user programmable features. The keypad 43 includes a set of standard buttons that are required to dial a telephone number and a set of dedicated buttons for special functions.

Data entered at the keypad 43 is provided to the processor 44, where the data is processed. External memory 56 may be connected to the processor 44 for storing program code in ROM or data in RAM. Alternatively, the processor 44 may include its own RAM or ROM. The processor 44 performs all the switching capabilities required to send a call via RF communications. The call, sent via RF communications, is processed in the processor 44 which formats the data and instructs the data to be sent to the RF Modulator 45. The RF Modulator 45 then transmits the modulated carrier through the RF Transmission/Receiving unit 46 and over the mobile unit's antenna 58.

Voice communications performed via the wireless system 5 requires processing of I/O or Input/Output analog signals since the microphone 54 and the speaker 52 are analog devices. The voice signals produced by the microphone 54 are converted to digital representations by codec 50. After conversion, the digital signal may be encoded or encrypted prior to RF transmission to provide security of the communications or to minimize (or compress) the amount of digital information prior to RF transmission. For example, the voice data may be encoded using any known available algorithm for coding voice data including, for example, Code-Excited Linear Predictive Coding (CELP).

The RF Transmission/Receiving unit 46 transmits a radio frequency signal representing the data to be transmitted. The codec 50 provides the processor 44 with digitized voice data, which is then presented to the RF Modulator 45 for digitally modulating the RF carrier for broadcast through the RF Transmission/Receiving unit 46 and the antenna 58. Call voice data, received over the antenna 58 and by the RF Transmission/Receiving unit 46, is de-modulated from the RF carrier within the RF Modulator 45 and presented to the processor 44 in digital form for routing to the codec 50. The codec 50 converts the digital voice data into analog signals for the speaker 52 transducers to convert to sound waves enabling the user to hear the transmitted voice through the speaker 52. The processor 44 encrypts or compresses any digital signals being transmitted prior to these signals being presented to the RF Modulator 45 for eventual broadcast. Upon receiving call data, the processor 44 decrypts or decompresses any digital signals received from the RF Modulator prior to presentation to the codec 50.

Digital data from a facsimile or computer modem source which has been transmitted to a mobile unit 2 is recognized by the transmission of digital data signal protocols sent at the beginning of any facsimile or computer modem transmission. The processor 44 reads these coded instructions and routes the digital data to the modem 65 (wherein such a mobile unit has been equipped with such a device and a corresponding phone jack RJ-11 output) for output to an attached facsimile or computer 63. This routing avoids converting these digital signals to analog by the codec 50. It must be noted that most mobile units will lack such a capability and facsimile or computer transmissions to such units will be ignored.

In operation, the RF Transmission/Receiving unit 46 may be capable of transmitting and receiving data at a variety of frequencies through antenna 58. For example, the RF Transmission/Receiver unit 46 may be configured to operate in the traditional cellular frequency of 800 MHz. In another embodiment of the invention, the RF Transmission/Receiver unit 46 permits the mobile unit 2 to operate in the PCS frequency of 1.9 GHz. Once again, other frequencies would also be acceptable, and it is presently contemplated that frequencies within the range of 50 MHz to 5 GHz may be used, and preferably 400–450 MHz.

In a configuration where a mobile unit 2 is associated with a fixed base unit 4 that is not connected to a PSTN 8 interface, outgoing PSTN 8 destined calls may be automatically placed on the associated mobile unit 2 by accessing the repeater 6 network where repeater 1 is linked to the PSTN 8. Calls placed from such an associated mobile unit 2, incurring a toll within the PSTN 8 will be logged in a known fashion by a billing computer associated with repeater 1 and billed accordingly. Incoming PSTN 8 calls (collect calls only) bound for internal mobile units 2 or fixed base units 4 not connected to the PSTN, will be billed accordingly. No billing will occur for non-toll calls. Routing of a mobile unit 2 call to a PSTN phone located outside the system 5 will first be through the associated fixed base 4, then through the PSTN 8 interface connection associated with repeater 1.

It must be understood that a fixed base unit 4 does not require an associated mobile unit 2 for operability, nor does a mobile unit 2 require an associated fixed base unit 4 for independent operability. Such association is merely a convenience and should be viewed as operating much as an extension telephone would perform in a wireline system; with the unique ability for independent mobile unit 2 operation, if desired.

Referring again to FIG. 2, all repeaters 1 and 6 are identical with the exception of repeater 1 which is configured to interface with the PSTN 8.

Each repeater 1 and 6 is in an active listening (squelch on) mode, ready to boost or re-broadcast any mobile unit 2's or fixed base unit 4's signal when instructed to do so. Instructions to boost or rebroadcast a mobile unit 2's or a fixed base unit 4's signal may be given manually by the user or may occur automatically when either unit's Call Initiation Sequence (explained in detail below with reference to FIG. 6A) has exceed a predetermined time (for example, 45 seconds) and the user wishes to continue to attempt to contact their desired mobile unit 2 or fixed base unit 4. Following an additional predetermined time period (for example, 30 seconds) of the rebroadcast of the Call Initiation Sequence by the repeaters 1 and 6, the entire system resets and the user must try again. This unique feature of the repeater system is extremely beneficial when the desired receiving unit has ventured beyond direct point-to-point, unit-to-unit communicating range.

Thus the present invention may either demand repeater use, or repeater use may be invoked automatically. In the Boost Demand Mode any system transceiver initiating a Call Initiation Sequence may immediately instruct the repeater network to re-broadcast the Call Initiation Sequence. This is useful when the caller is certain the potential receiver of the call is out of direct, point-to-point communications. In the Call Boost Sequencing Mode a system transceiver's Call Initiation signal is automatically boosted after a predetermined time. The activation would occur only after a transceiver user (mobile or fixed base unit) initiated a Call Initiation Sequence and received no acknowledgment within a predetermined time. The user's transceiver automatically adds a Boost Demand Code to the Call Initiation Sequence Code after the predetermined time. The repeaters, having then recognize the Boost Demand activation code, and activate and re-broadcast the transceiver's Call Initiation Sequence for another predetermined time period, awaiting any Call Return acknowledgment signals. Should no Call Return acknowledgment be received during this second predetermined time period, the entire system would reset or shut down the sequence.

Repeater 1 is designed to serve system 5 users in three ways: first, as a standard rebroadcast of mobile unit 2 or fixed base unit 4 signals; second, as mobile unit 2's and fixed base unit 4's access to outside PSTN 8 phones; and third, to maintain a system 5, PSTN 8 assigned phone number, for any outside PSTN callers wishing to reach internal mobile units 2 or fixed base units 4 not directly interfaced with the PSTN 8 system.

All repeaters 1 and 6 are activated in cascade fashion when a rebroadcast request is received, virtually instantaneously.

Figure 6A:
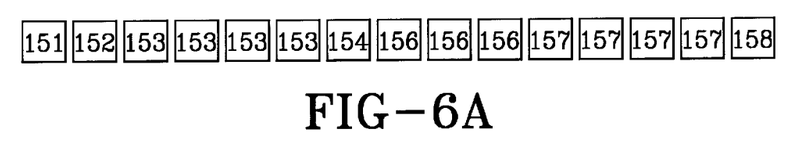
FIGS. 6A, 6B and 6C are exemplary code strings used in the present invention.
Figure 6B:
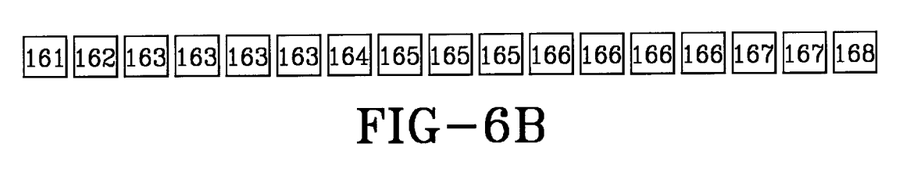

All repeaters 1 and 6 read or listen to Call Initiation Sequence Codes and Call Return (Acknowledgment) Codes (see, FIGS. 6A and 6B). Only when a code is recognized to boost or rebroadcast signals from mobile units 2 or fixed base units 4, will the repeaters activate. Repeaters 1 and 6 cease to re-broadcast when data transmission or conversation ceases on both transmission pair frequencies for more than a predetermined time, for example, 20 seconds.

Several flowcharts of the operation of the present invention are shown in FIGS. 5A–5E. In practice, these flowcharts are encoded in appropriate programming code for utilization by both mobile unit 2 and fixed base unit 4 processors (44 and 14), respectively, and placed in storage on the units' ROM external memories (56 and 30), respectively, on FIGS. 4 and 3.

Figure 5A:
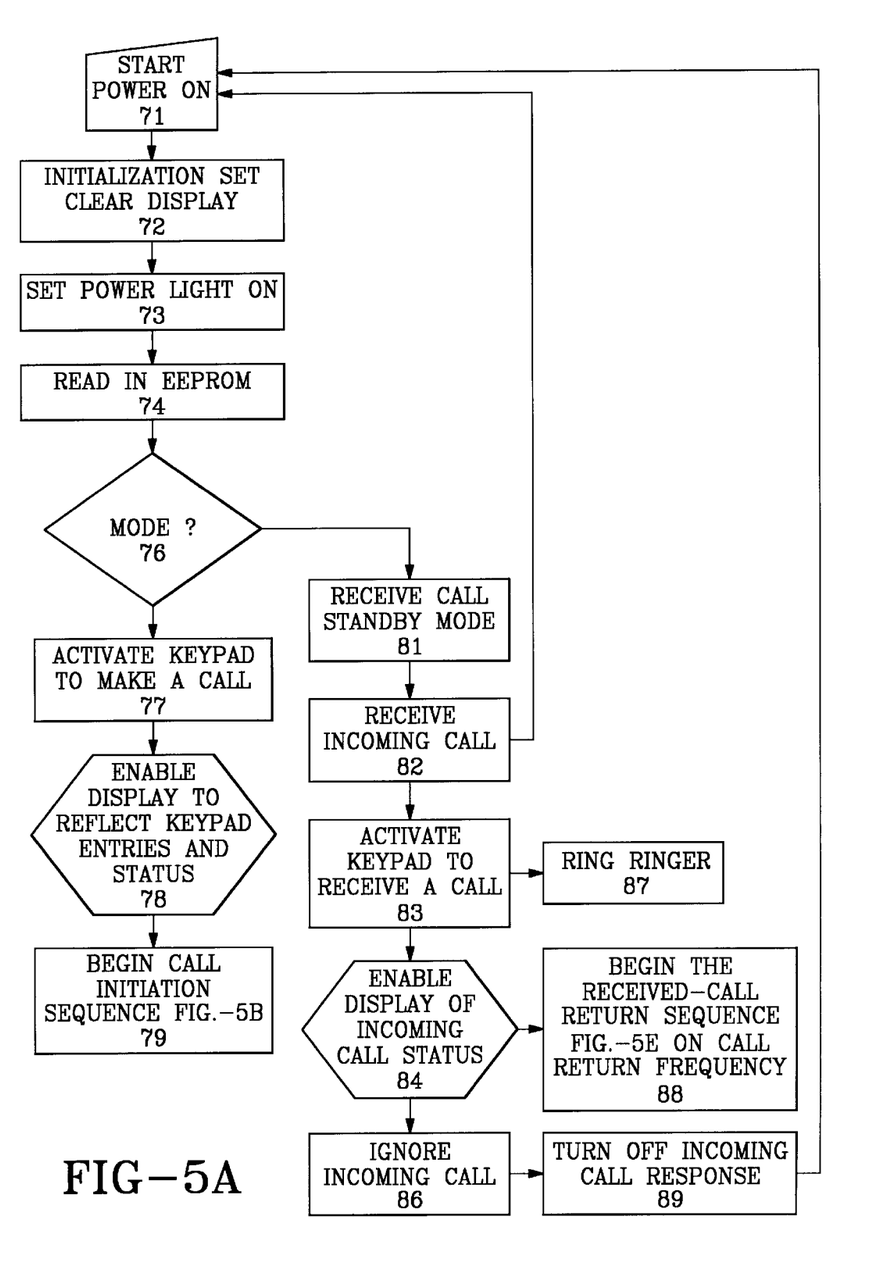
FIGS. 5A through 5E are flowcharts of the method of operation of the system of FIGS. 3 and 4, in accordance with the present invention.

Referring to FIG. 5A, a mobile unit 2 or fixed base unit 4's Standby and Auto Mode operating method used in the present invention is described. When a user of the present invention chooses to place a mobile unit 2 or a fixed base unit 4 in operation, step 71 recognizes the activation of the power switch to place the unit in a Standby Mode.

Step 72 provides the user a display for possible entry of numbers in the dialing mode or for displaying the number of an incoming call. This mode also gives the user a view of whether the battery is low or not. After, step 73 activates an indicator, for example a small light, on the unit to indicate the unit is on and in the Standby Mode. The EEPROM memory is downloaded into the processor in step 74; making the two possible operating programs available for the next choice of events.

Step 76 asks the unit continuously what mode of operation is desired (Call Receive Mode or Call Initiation Mode). Should the user choose to make a phone call by dialing a number, the Call Initiation Mode is invoked. The keypad registers the numbers to be dialed in step 77, triggering step 78. When the keypad actions are noted, the display begins to reflect the numbers entered on the keypad and the status of the call's progress. Step 79 begins the full Call Initiation Sequence illustrated in detail by FIG. 5B and FIG. 6A.

When in the Standby Mode, if step 76 determines that a call is being received, control passes to step 81. The call begins to be received in step 82 on the Call Initiation Frequency and triggers the main systems of the transceiver to power-on for a possible response. The keypad in step 83 and the ringer in step 87 are simultaneously activated. Step 84 activates the display to alert the user to the identity of the caller's number. Simultaneously to step 84, step 88 (Begin the Received Call Return Sequence FIG. 5E on the Call Return Frequency) is initiated and is further defined in FIG. 5E and FIG. 6C. Step 86 stops any action regarding step 88, while step 89 (Turn Off Incoming Call Response) notifies the main systems of the transceiver to power-down, as response is not desired. This step 89 is automatic after a predetermined time, for example, 30 seconds of ringing. All such efforts are designed to save power. The Call Return Frequency is a system frequency designated for all direct wireless system transceivers to return an acknowledgment signal/message only, to a Call Initiation transceiver.

Figure 5B:
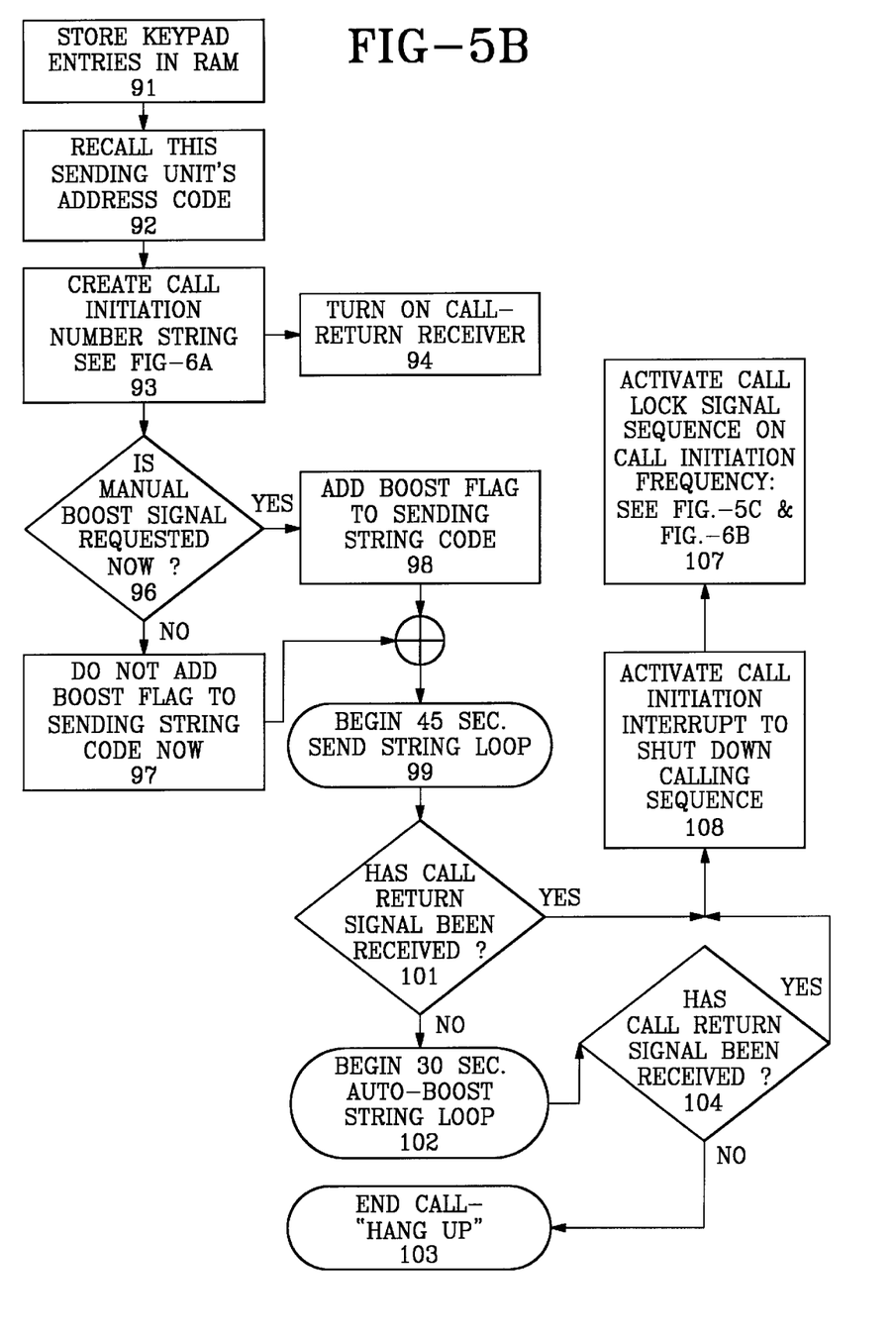

Referring to FIG. 5B, the call initiation sequence method used in the present invention is described. FIG. 5B is a continuation and an elaboration of the sequence of events begun in previous step 79, illustrated in FIG. 5A.

When a number is dialed on a transceiver phone within system 5, the Call Initiation Sequence begins. RAM memory (FIG. 3, memory 30 or FIG. 4, memory 56) stores the numbers dialed in from the keypad. ROM memory (also contained in FIG. 3, memory 30 or FIG. 4, memory 56) is activated to recall the dialing unit's origination number (digital address).

Step 93 begins the construction of the Call Initiation Sequence Number String. The FIG. 6A gives a detailed explanation of this string. In the exemplary code string the following elements of code are combined: a preamble 151, a start bit 152, a destination address 153, a squelch flag bit added in the off mode 154, a boost signal flag bit in the off mode 156, an origination address (as in the ROM) 157 and a stop bit 158, completing the number string.

The program, in step 94, also turns on the call-return receiver at the same time as step 93 is creating the string.

In step 96 the processor determines if the dialing user has manually pressed the boost button, requesting immediate repeater assistance. If the answer is yes, the number string boost bit flag code is set to on and the sequence proceeds to step 99 (Begin 45 second Send String Loop). If step 96 determines that the answer is no, the program proceeds immediately to step 99, without activating the boost flag in the number string.

As the sequence continues, step 99 begins the timed 45 second send loop. The combined string is then routed from the processor to the RF modulator to be added to an FM carrier for broadcast by the transmitter over the Call Initiation Frequency. This process creates a repeated activation of the dialing or sending unit's RF Transceiver with 100 ms bursts of Call Initiation Sequence Code sent on the Call Initiation Frequency. The Call Initiation Frequency is a particular FM frequency designated for all system transceiver initial call placements only, to other system transceivers, i.e., mobile, fixed base or repeater transceivers.

During this step 99, the step 94 activation of the all-return receiver has enabled the sending unit to also listen for a response to the call. This is done simultaneously. Transmission code which is utilized as an identifier of this process is generated by unit receiving the call, if and only if, the unit is answered. A detailed illustration of this code string (the Received Call Return Number String) is given in FIG. 6C.

As the Initiation Loop 99 is repeated every 100 ms for 45 seconds, the operator of the sending unit hears the phone ringing until someone answers.

If a signal is received and produces a yes answer in step 101 (Has Call Return Signal Been Received?), a trigger 108 would send an interrupt to the calling process (the Call Initiation Sequence.)

If the phone continues to ring for a predetermined time (for example, 45 seconds) without being answered, the Call Initiation Sequence halts momentarily, 102, and resets the boost signal flag in the Call Initiation Sequence Number String and the new version is re-broadcast. Since the boost is set to on, the nearest repeater activates and rebroadcasts the signal. All other repeaters also hear this new version of the string and cascade on line. This sequence is activated because it is considered possible by the dialing person that the other phone may have been out of reach of point-to-point communications for the first 45 seconds.

Again, during sequence 102, the question is asked: Has Call-Return Signal been received yet?, 104. If yes, step 108 stops further sending of the Call Initiation Sequence String. Step 107 then activates with the Call Lock Signal Sequence as detailed in FIG. 5C and FIG. 6B.

However, if after the additional 30 second effort the number still does not answer, the whole sequence terminates and the phone automatically hangs up 103 on the dialing person.

Figure 5C:
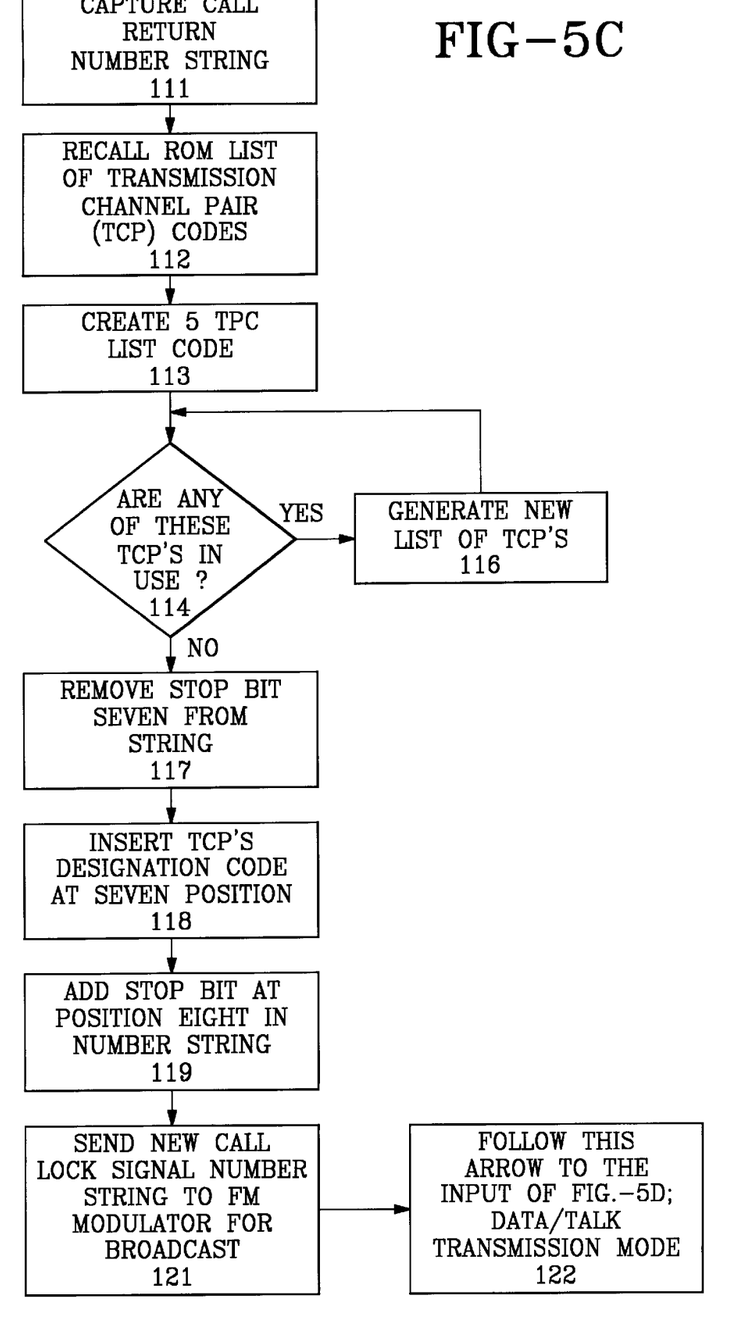
Figure 5D:
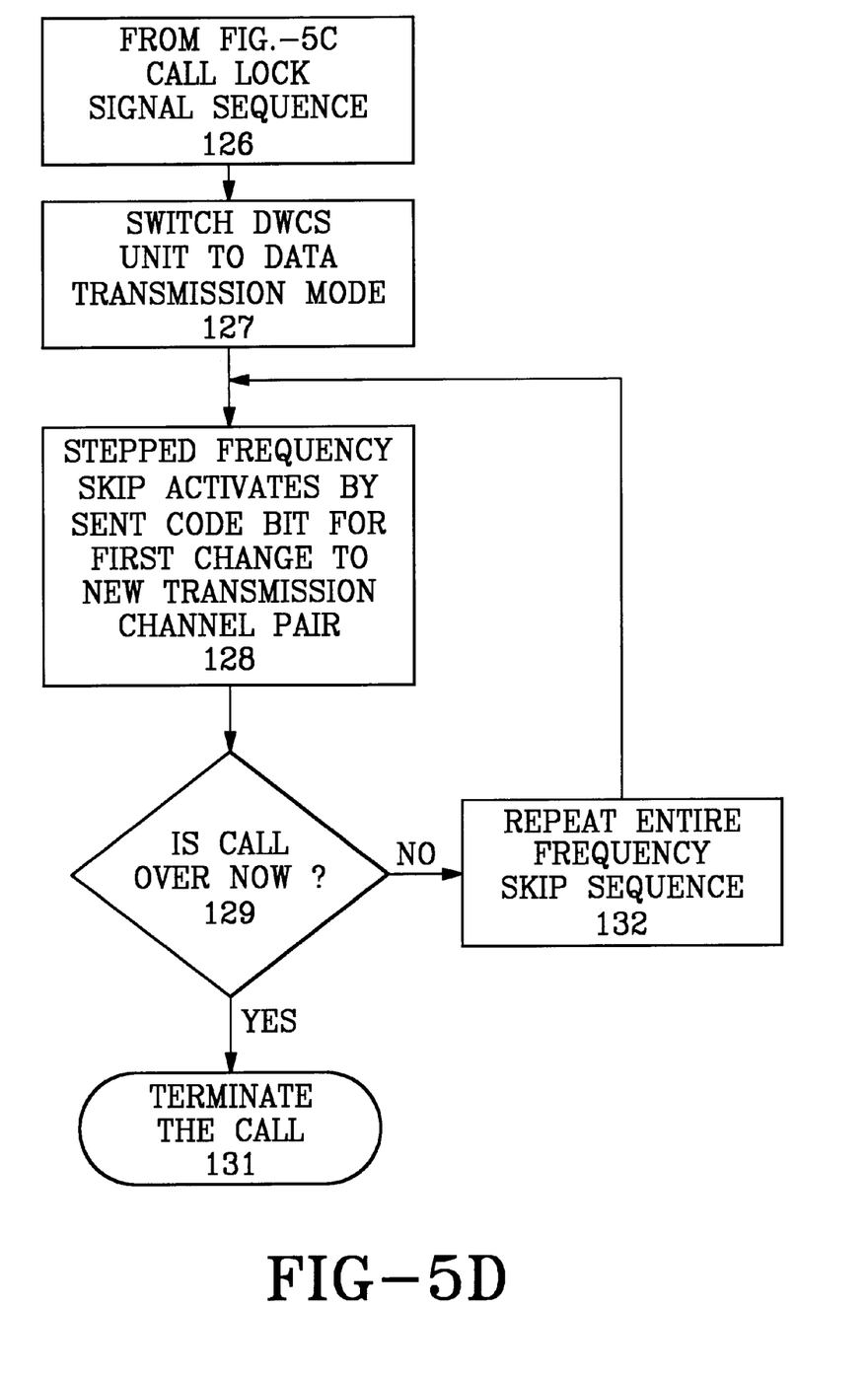
Figure 5E:
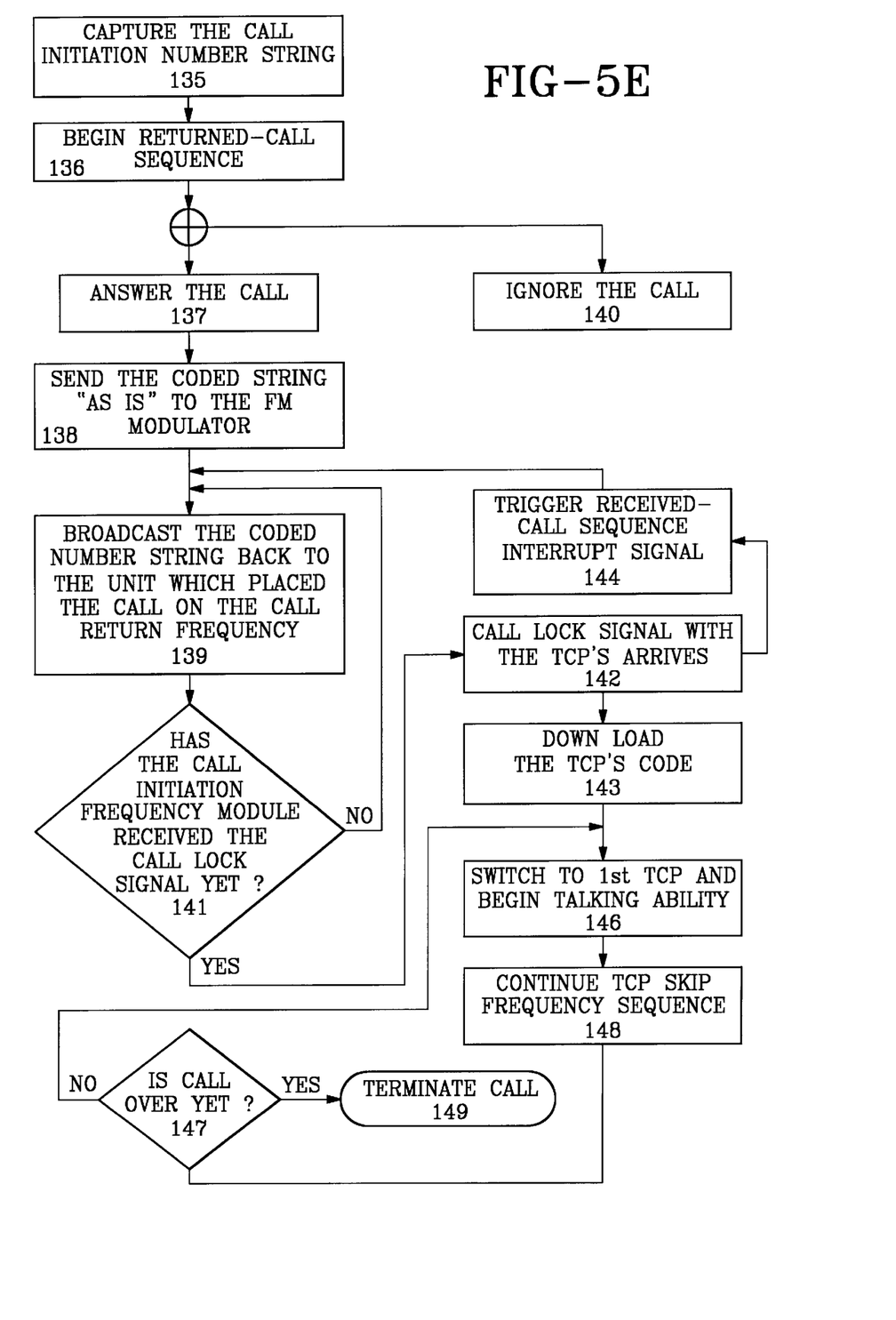

Referring to FIG. 5E, the Received Call Return method used in the present invention is described. To receive a call, the unit being called must be on and in the Standby Mode. As this unit begins to receive the call (recognize its own address) and to capture the Call Initiation String Code 135, it places the number that is calling on the display. This is accomplished by the unit, in step 136, with systems responding to the Call Initiation Sequence Number String: a squelch flag bit that is set to off, canceling squelch and switching the unit to Auto Mode, for example; thus activating the phone's ringer.

If the phone's owner is away or chooses not to answer 140, the phone continues to ring as long as it receives the Call Initiation signal. No Call-Return response can be given in this case.

Should the receiving station owner answer 137, the Auto Mode activates the Received Call Return Sequence. RAM is accessed for the stored number string just received. The Received Call Number String is defined in FIG. 6C as follows: the preamble 169, the start bit 170, the destination address 171, the squelch flag bit 172, the boost flag 173, the origination address 174, and the stop bit 175. The Received Call Return protocol 138 then routs an exact copy of the Call Initiation String (as above defined) to the Call Return Frequency for return to the dialing unit. If this string contained an activated boost flag, the nearest repeater examines the string and noting the boost flag is on, is instructed to boost the signal.

After the call has been answered and the Received Call Number String broadcast, the Receiving Unit remains in the Auto Mode 141. Further instructions from the sending unit are expected immediately in the form of the Call Lock Signal Sequence 142 and FIG. 5C sent to the receiving unit on the Call Initiation Frequency. In step 142, the receiving unit receives the Call Lock Signal Number String as detailed in FIG. 6B. Step 144 sends an interrupt signal to end the broadcasting of the Received Call Number String. Simultaneously to step 144, step 143 activates the protocols for setting up the frequency-skip codes by down loading the Transmission Channel Pairs Code ("TCP"). This step tells the receiving unit on what Data/Talk channels the sending unit expects to communicate with the receiving unit.

The present invention uses broadcast frequency pairing wherein even and odd frequencies adjacent to each other are paired for use in system transceiver communications after Call Initiation and Call Return sequences have established a communications link. In the exemplary embodiment, even numbered frequencies are designated for the Call Initiating transceiver to use for information/conversation transfers to the linked transceiver, and odd numbered frequencies are used for the Call Return transceiver to use for information transfers back to the Call Initiating transceiver. Other frequency division techniques would also be acceptable.

Step 146 activates the first pair of Data/Talk Channels in the Frequency Skip sequence. Step 148 continues the sequence of Frequency Skipping according to the agreed code. Step 147 is a polling protocol for determining if the call is over. Should the call continue beyond the agreed Frequency Skip protocol, the two systems automatically reset to step 146 and continue the Frequency Skip pattern. Step 149 terminates the call after the call is over.

In accordance with the illustrative embodiment of the present invention, following the successful completion of a Call Initiation Sequence and a return Call Return Sequence linking two system transceivers, a third call is broadcast back to the Call Return transceiver with the Frequency Skip codes. The Call Initiation transceiver is always responsible in the system for sending this code: In operation, the Call Initiation transceiver acknowledges receipt of a Call Return signal from the Call Return transceiver and requests the Call Return transceiver to switch to a particular frequency pair (e.g., XYZ2 and XYZ3) for the conversation. The Call Initiation transceiver sends another frequency pair code after a predetermined time, for example, two minutes. The Call Return transceiver uses one of the frequency pairs (for example, the odd frequencies) and the Call Initiation transceiver uses the other of the frequency pairs so that full duplex communication is accomplished. Repeater systems would also follow these sequences since they would be receiving the frequency skip codes for proper frequency tracking.

Where it is deemed that no security requirement exists, frequency skipping may be eliminated and system transceivers may utilize a single pair of broadcast frequencies for conversation and data transfer selected at the time of call linkage.

Referring to FIG. 5C, the Call Lock Sequence method used in the present invention is described. When the dialing or origination station receives the Returned-Call Sequence on the Return Call Frequency (indicating someone answered at the other end), one of the two Call Initiation Loops, FIG. 5B, step 99 or 102, is sent an interrupt trigger, FIG. 5B, step 108, halting the broadcast of the Call Initiation String.

The sending unit's Auto Mode is now activated. The Call Lock Number String, as defined in FIG. 6B, is prepared to be sent on the Call Initiation Frequency. This will be the last call to receiving unit on this frequency during this call. This number string contains: a preamble 161, a start bit 162, the receiving station's digital address 163, a squelch flag bit 164, a boost flag bit 165 matching the correct set position the receiving unit got in the first transmission, the origination address 166, the Transmission Channel Pair to be used for talking and frequency skipping 167, and a stop bit 168.

Since the receiving station already has the origination code locked in and is operating in the Auto Mode, and the destination station's also in the Auto Mode, no other station can hear or read the transmission string; except the repeaters. This Call Lock String is repeated several times, for example 25 times at 100 ms intervals.

The sending station and the receiving station then switch to the Transmission Mode on the first agreed Transmission Channel Pair, as in FIG. 5E, step 146. A switch code is sent during the conversation, automatically switching the two units to the next agreed channel pair (as in FIG. 5E, step 148).

Referring to FIG. 5D, the Talk/Data Transmission method used in the present invention is described.

In the Auto Mode, both the receiving and sending units enjoy full duplex, continuous communications without so-called "push-to-talk" problems normally associated with point-to-point radio communications. No other station may hear the conversations or data transfer. This is accomplished by flagging all transmissions between the two units (on both transmission frequencies) with a squelch-on override command bit inserted periodically in the digitized transmissions. The effect is to lock out any other station trying to access these channel pairs.

The squelch-on flag bit would be ignored by the Locked-In transmitting units functioning in the Auto Mode. Also, all Boosted Data/Talk signals would be rebroadcast by all repeaters on all the agreed Transmission Channel Pairs, without acknowledging any embedded squelch-on flag bit or being Locked Out.

It is contemplated that all system transceivers will be issued an identification number, except those fixed base transceivers which are interfaced with a PSTN and have an assigned PSTN phone number.

It is also contemplated that when an owner of a PSTN interfaced fixed base transceiver also has an associated mobile system transceiver, the fixed base transceiver may be set to Ring Through to the mobile unit; i.e., Call Forwarded. A call from an outside PSTN phone to a fixed base direct wireless system unit Forwarded, will experience a transparent call completion sequence.

It is also contemplated that all system transceivers may broadcast a Caller ID signal when in the Call Initiation Sequence. Also, any PSTN call (placed to a system number) which contained a Caller ID code would have the Caller ID passed through to the direct wireless system unit's display.

Where necessary and appropriate, a special Call Initiation Sequence code could be sent by the Primary transceiver, repeater 1, in a one-way format to all transceivers announcing severe weather, flash floods, land fires or other such disasters. All repeaters would rebroadcast an Every Transceiver Alert code and a period of time would be given for as many to answer as possible. The user interface display would alert the user to the nature of the call visually.

Referring to FIG. 6A, the Call Initiation Code String used in the present invention is described. Other number strings may also be used without departing from the present invention. The following elements of code are combined to form this string: a preamble 151, stated one time; a start bit 152, stated one time; a destination address 153, repeated four times; a squelch flag bit added in the off mode 154, stated one time; a boost signal flag bit in the off or on mode 156, repeated three times; an origination address 157, repeated four times; and, a stop bit 158, stated one time, thus completing the number string.

Repeating the various phrases of the string keeps the plurality of systems listening to the code from misreading the information. It also reduces the possibility of sending single code errors.

Referring to FIG. 6B, the Call Lock Signal Code used in the present invention is described. Other number strings may also be used without departing from the present invention. The following elements of code are combined to form this string: a preamble 161, stated one time; a start bit 162, stated one time; a destination address 163, repeated four times; a squelch flag bit added in the off mode 164, stated one time; a boost signal flag bit in the off or on mode 165, repeated three times; an origination address 166, repeated four times; a transmission channel pairs code (TCP) 167, repeated twice; and, a stop bit 168, stated one time, thus completing the number string.

Once again, repeating the various phrases of the string keeps the plurality of systems listening to the code from misreading the information. It also reduces the possibility of sending single code errors.

Figure 6C:
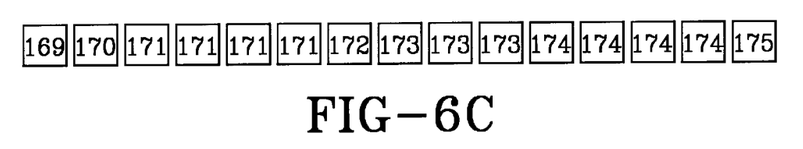

Referring to FIG. 6C, the Received Call Return Code used in the present invention is described. Other code strings may also be used without departing from the present invention. The following elements of code are combined to form this string: a preamble 169, stated one time; a start bit 170, stated one time; a destination address 171, repeated four times; a squelch flag bit added in the off mode 172, stated one time; a boost signal flag bit in the off or on mode 173, repeated three times; an origination address 174, repeated four times; and, a stop bit 175, stated one time, thus completing the number string.

Once again, repeating the various phrases of the string keeps the plurality of systems listening to the code from misreading the information. It also reduces the possibility of sending single code errors.

All of the methods and/or apparatus disclosed herein can be made and controlling software written without undue experimentation in light of the present disclosure. While the devices and methods of this invention have been described in terms of exemplary embodiments, it will be apparent to those of skill in the art that variations may be applied to the methods and/or apparatus in the steps or in the sequence of steps of the methods described herein without departing from the concept, spirit, and scope of the invention. Therefore, all such substitutions and modifications apparent to those skilled in the art are deemed to be within the scope of the invention as defined by the appended claims.

What is claimed is:

1. A method of operating a wireless communication system, said system including a plurality of transceivers, said method comprising:

in a first mode of operation, establishing intra-system duplex communication between one of said plurality of transceivers and another one of said plurality of transceivers, without the use of a public switched telephone network comprising:

performing a call initiating procedure between an originating transceiver and a destination transceiver including sending a frequency skip code;

upon successful completion of said call initiating procedure, establishing voice or data communication between said transceivers comprising:

transmitting from the originating transceiver using one of a broadcast frequency pair and transmitting from the destination transceiver using the other one of a broadcast frequency pair;

periodically changing said broadcast frequency pair as a function of the frequency skip code; and in a second mode of operation, establishing inter-system duplex communication between one of said plurality of transceivers and a communication device outside of said system, using the public switched telephone network and at least one stationary transceiver.

2. The method of claim 1, said step of performing a call initiating procedure comprising:

transmitting from an originating mobile transceiver, a call initiation sequence, including an address of said originating mobile transceiver and an address of a destination mobile transceiver;

transmitting from said destination mobile transceiver, a return sequence, in response to said call initiation sequence; and transmitting from said originating mobile transceiver, a call lock sequence, in response to said call return sequence.

3. The method of claim 2, wherein:

said transmitting of said call initiation and call lock sequence from said originating transceiver to said destination transceiver being on a single call set-up frequency; and said transmitting of said call return sequence from said destination transceiver to said originating transceiver being on a single call return frequency.

4. The method of claim 2, said system further including at least one at least one repeater, said method further comprising:

including a boost code in said call initiation sequence; and activating said at least one repeater in response to receipt by said at least one repeater of a call initiation sequence including a boost code, causing said repeater to receive, amplify and re-transmit communications from said originating transceiver and said destination transceiver.

5. The method of claim 4, said including step comprising, including said boost code in response to a request by a user of said originating transceiver.

6. The method of claim 4, said including step comprising:

transmitting a call initiation sequence without a boost code for a predetermined time period; and if no call return sequence is returned within said predetermined time period, adding a boost code to said call initiation sequence, and re-transmitting said call initiation sequence for a second predetermined time.

7. The method of claim 2, wherein the frequency skip code is transmitted in the call lock sequence.

8. The method of claim 1, said system further comprising at least one repeater connected to said public switched telephone network, said method further comprising:

establishing inter-system duplex communication between one of said plurality of transceivers and a communication device outside of said system, using said public switched telephone network and said at least one repeater connected to said public switched telephone network.

9. A wireless communication system, comprising:

a plurality of mobile transceivers;

at least one stationary transceiver, at least one of said at least one stationary transceiver being connecting to a public switched telephone network; and each of said plurality of mobile transceivers and each of said at least one stationary transceiver including a data processor programmed to operate said transceiver in a stand-by mode, in a call receive mode, or in a call transmit mode, and to conduct both intra-system communication without use of said public switched telephone network, and inter-system communication using said public switched telephone network; and the call transmit mode transmits from an originating transceiver using one of a broadcast frequency pair and transmits from the destination transceiver using the other one of a broadcast frequency pair wherein the broadcast frequency pair is periodically changed as a function of a frequency skip code.

10. A wireless communication system, said system including a plurality of transceivers, comprising:

means for establishing intra-system duplex communication between one of said plurality of transceivers, without the use of a public switched telephone network comprising:

means for performing a call performing a call initiating procedure between an originating transceiver and a destination transceiver including sending a frequency skip code;

means for establishing voice or data communication between said transceivers comprising upon successful completion of said call initiating procedure;

means for transmitting from the originating transceiver using one of a broadcast frequency pair and transmitting from the destination transceiver using the other one of a broadcast frequency pair;

periodically changing said broadcast frequency pair as a function of the frequency skip code; and means for establishing inter-system duplex communication between one of said plurality of transceivers and a communication device outside of said system, using the public switched telephone network and at least one stationary transceiver.

11. The method of claim 2, wherein:

said transmitting of said call initiation and call lock sequence from said originating transceiver to said destination transceiver being on a first call set-up frequency; and said transmitting of said call return sequence from said destination mobile transceiver to said originating mobile transceiver being on a second call return frequency.

* * * * *